UNITED STATES PATENT OFFICE.

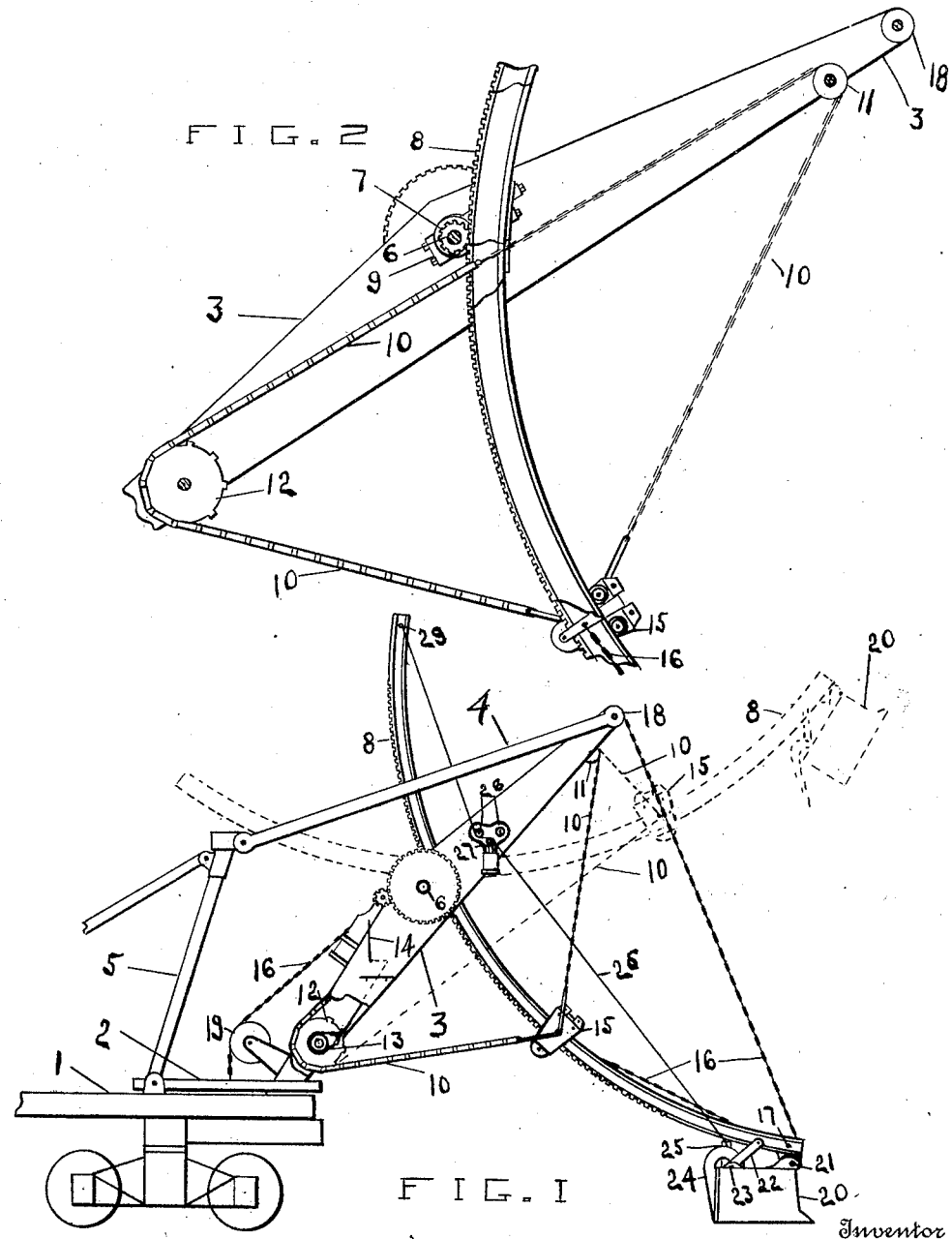

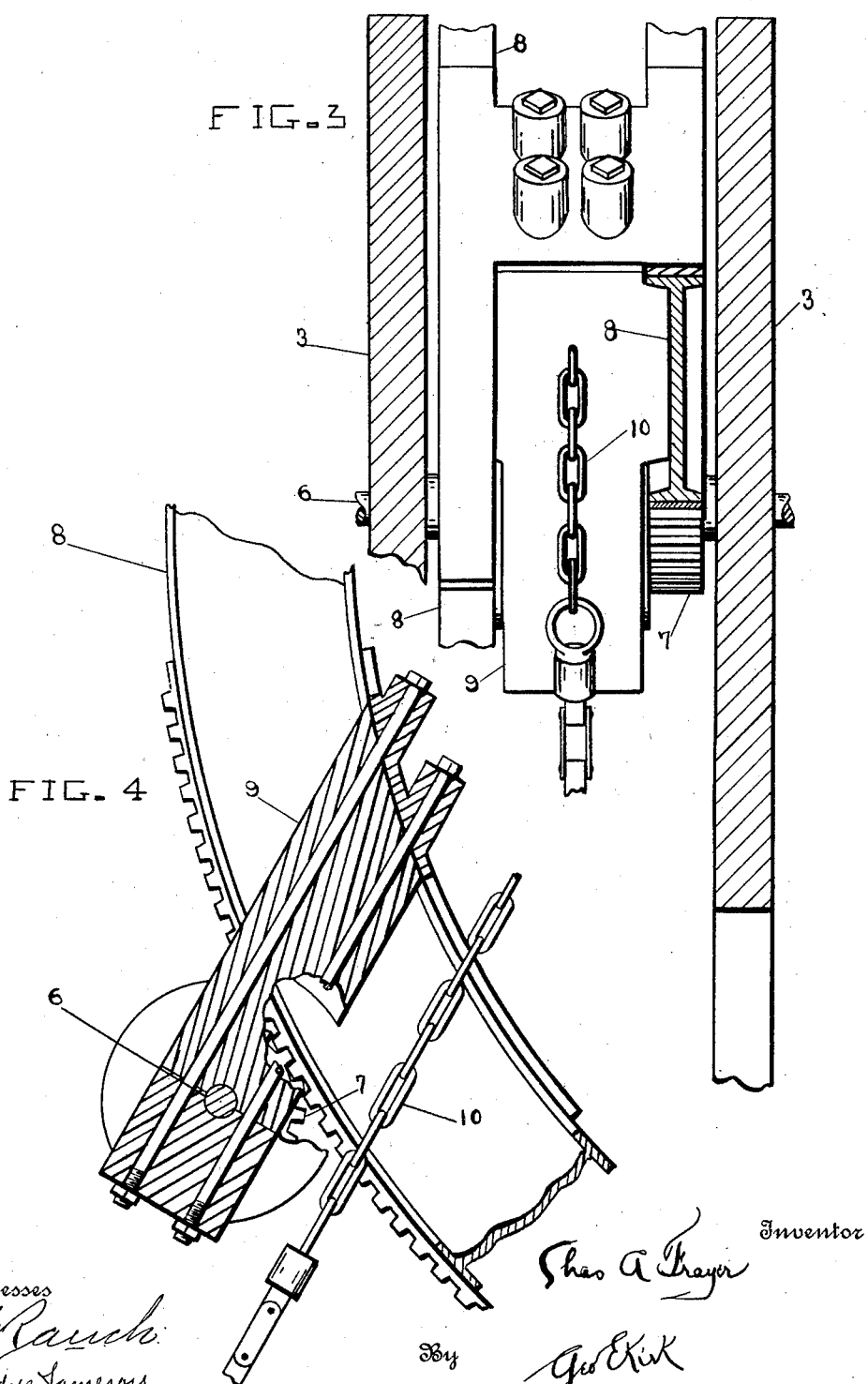

CHARLES A. FRAYER, OF TOLEDO, OHIO, ASSIGNOR TO THE VULCAN STEAM SHOVEL COMPANY, OF TOLEDO, OHIO, A CORPORATION OF OHIO.

EXCAVATOR.

997,052.  Specification of Letters Patent.  Patented July 4, 1911.

Application filed January 20, 1910. Serial No. 539,046.

*To all whom it may concern:*

Be it known that I, CHARLES A. FRAYER, a citizen of the United States, residing at Toledo, Lucas county, Ohio, have invented new and useful Excavators, of which the following is a specification.

This invention relates to features for increasing the range of action of excavators.

This invention has utility when embodied in power shovels of the forward-acting type, in which the filling of the shovel occurs in its travel away from the machinery.

Referring to the drawings: Figure 1 is a fragmentary view in side elevation showing an embodiment of the invention in a forward-acting power shovel; Fig. 2 is an enlarged detail view of the boom, one of the sections being removed to show the mounting of the directing member and its control features therein; Fig. 3 is a front view of the diagonal block mounting the directing member in the boom; and Fig. 4 is a section of said block.

Mounted on the deck 1 of the vehicle, is the turn table or platform 2 carrying the forwardly extending overhanging frame or boom 3, the upper free end of which is held by guys 4 extending to the A-frame 5 mounted on the deck 1 adjacent the platform 2.

Power driven shaft 6, mounted in the boom 3, carries pinions 7 meshing with racks on the directing member 8, shown of the crooked or curved type and having diagonally disposed to its general line of direction the block 9 pivotally mounted on the shaft 6. The bosses about the bolts in Fig. 2 determine the extent of the block 9 between the parallel I-beam portions of the directing member, notwithstanding the plate portions have a greater extent on said members. This block 9 serves as a primary guide for the member 8 in its reciprocation as to the shaft 6. Placing of this block 9 diagonally as shown allows clearance between the parallel portions of the member 8 for the connections 10 passing about guide 11 near the outer end of the boom 3, and about the sprocket wheel 12 near the base of the boom 3. This sprocket wheel 12 may be held by band brake 13 as controlled by the hand lever 14.

The connections 10 passing over guides 11 and wheel 12 extend to the auxiliary or secondary guide 15 mounted on the member 8. Connected to this guide 15 and effective to hold it spaced from the boom or frame 3, is the hoisting line 16 passing about guide 17 near the end of the member 8, thence over guide 18 near the free end of the boom 3, and thence over the guide 19 centrally of platform 2 to the source of power, at the hoisting drum. Adjacent the guide 17, the digging member or bucket 20 has connections 21, 22, to rigidly mount it upon the member 8. This working member 20 has an outwardly swingable pivoted back 24 normally held closed by the latch 25, from which extends the trip line 26 past the movable guide means 27 reciprocable as to the pair of opposing guide means 28. Near the end of the member 8 remote from the bucket 20, the line 26 has attachment 28 to the member 8. The auxiliary guide, the crooked directing member, or both, are susceptible of ready attachment with little special adaptation to regular excavator structures.

In operation, the hoisting line pulls the guide 15 to a maximum of remoteness from the guide 9, thus placing the flexible connections 10 under tension upon at least one reach thereof, when the wheel 12 is held. This gives a firm holding for the directing member 8 at two spaced points, so considerably stiffening it that materially longer directing members may be serviceable in digging travel away from the platform. The hoist line 12 is effective during digging travel forward of the bucket as the directing member is pivotally held by the guide 9 and further controlled by the guide 15, which latter guide may be held and thrusting thus better determined from actuation of shaft 6. With the crooked member, especially, this thrusting action may clear out material or dig forwardly in an action away from the platform in filling, toward a perpendicular wall. With all the bucket connections to the member within the width of the bucket, clear cutting or clean removal at the sides may be accomplished. With the bucket filled, wheel 12 may be freed, allowing the hoisting line to oscillate the member 8 upward about axis of shaft 6, while if desired the member may be simultaneously reciprocated inward or outward. The curvature of the member 8 insures clearance of A-frame in this lifting operation, as shown in dotted lines Fig. 1, while it also allows of great height in dumping, often a most desirable feature when the machine is working in its trench and dumping on the bank, or even into vehicles on the bank. To refill the bucket, the hoisting line is slacked, and shaft 6 actuated to so reciprocate the member 8 as to bring the bucket 20 into proper range for the next loading. The downward swing of the member 8 is permitted by freeing wheel 12. It is to be noted that the member 8 is directly and rigidly connected to the forward or digging end of the working member 20 to positively urge it in its resisted travel into material.

What is claimed and it is desired to secure by Letters Patent is:

1. An excavator comprising a frame, a crooked directing member, a mounting in the frame for the member through which the crooked portion of the member is reciprocable, and a bucket rigidly connected to the directing member.

2. An excavator comprising a frame, a curved directing member, a mounting in the frame for the member through which the curved portion of the member is reciprocable, a bucket rigidly connected to the directing member, and a guide for the directing member and spaced from the frame.

3. An excavator comprising a frame, a directing member mounted in the frame, a bucket rigidly connected to the directing member, a movable guide for the directing member spaced from the frame, and flexible connecting means from the guide extending to a point on the directing member more remote from the guide, and from thence to the frame.

4. An excavator comprising a frame, a directing member movably mounted in the frame, a bucket rigidly connected to the directing member, a controllable guide for the directing member and spaced from the frame, and flexible connecting means from the guide extending to a point on the directing member more remote from the guide, and from thence to the frame.

5. An excavator comprising a frame, a reciprocable directing member mounted in the frame, a digging member carried by the directing member, a guide for the directing member, a pair of connections from the frame to the guide permitting the guide to move with the swing of the directing member as to the frame, a brake for holding said connections and thereby limiting directing member travel to reciprocation, and a hoist line for the digging member extending to the guide.

6. An excavator comprising a frame, a directing member mounted in the frame, a bucket rigidly connected to the directing member, a guide for the directing member and spaced from the frame, a pair of connections extending from the frame to the guide, and actuating means for the directing member extending past the bucket to the guide, said means connected to the guide.

7. An excavator comprising a frame, a directing member, a block diagonally disposed as to the directing member for mounting the member in the frame, a bucket rigid with the directing member, operating connections for the member disposed through the member and approximately parallel to the block, the disposal of the block diagonally relatively to the member permitting clearance for the connections passing through the directing member, and means mounted adjacent the block for reciprocating the member while held by the block to thereby actuate the bucket.

8. An excavator comprising a frame, a curved directing member, a mounting in the frame for the directing member through which the curved portion of the member is reciprocable, and a forward-acting digging member carried by the directing member.

9. An excavator comprising a boom, a boom supporting platform, a crooked directing member, a mounting in the boom for the member through which the crooked portion of the member is reciprocable, a digging member carried by the directing member, and a hoist line coacting with the digging member in its travel away from the platform in normal digging.

10. An excavator comprising a frame, a crooked directing member, a mounting in the frame for the member through which the crooked portion of the member is reciprocable, and a forward-acting digging member having its forward end directly connected to the directing member.

11. An excavator comprising a boom, a boom supporting platform, a directing member, a block diagonally disposed as to the directing member and pivotally mounting the member for reciprocation as to the boom, a digging member carried by the directing member, operative connections for the directing member including means extending through the directing member and approximately parallel to a diagonal side of the block, said connections effective to cause the digging member to be firmly held in its travel away from the platform in normal digging, the disposal of the block diagonally to the directing member permitting clearance for the connections through the directing member, and means mounted adjacent the block for reciprocating the held directing member and thereby actuating the digging member.

12. An excavator comprising a boom, a boom supporting platform, a directing member reciprocably mounted in the boom, said boom providing a guide for the member, a second guide for the member spaced from the boom, a digging member carried by the directing member, and a hoist line extending to the second guide by way of the digging member coacting with the digging member in its travel away from the platform in normal digging.

13. An excavator comprising a boom, a boom supporting platform, a directing member reciprocably mounted in the boom, a digging member carried by the directing member, said digging member having adjacent thereto a hoist line guide, a directing member guide spaced from the boom, and operative connections including a hoist line coacting with the hoist line guide and extending to the directing member guide coacting with the digging member in its travel away from the platform in normal digging.

In testimony whereof I affix my signature in the presence of two witnesses.

CHARLES A. FRAYER.

Witnesses:
 GEO. E. KIRK,
 GLADYS JAMESON.

Copies of this patent may be obtained for five cents each, by addressing the "Commissioner of Patents, Washington, D. C."